(12) United States Patent
Kim

(10) Patent No.: US 11,544,771 B2
(45) Date of Patent: Jan. 3, 2023

(54) ELECTRONIC COMMERCE METHOD CAPABLE OF INTEGRATED ORDERING AND INTEGRATED DELIVERY, AND SERVER THEREFOR

(71) Applicant: BRINGKO CO., LTD., Daegu (KR)

(72) Inventor: Bo Jung Kim, Daegu (KR)

(73) Assignee: BRINGKO CO., LTD., Daegu (KR)

( * ) Notice: Subject to any disclaimer, the term of this patent is extended or adjusted under 35 U.S.C. 154(b) by 0 days.

(21) Appl. No.: 17/421,228

(22) PCT Filed: Jul. 31, 2020

(86) PCT No.: PCT/KR2020/010133
§ 371 (c)(1),
(2) Date: Jul. 7, 2021

(87) PCT Pub. No.: WO2021/025387
PCT Pub. Date: Feb. 11, 2021

(65) Prior Publication Data
US 2022/0044306 A1 Feb. 10, 2022

(30) Foreign Application Priority Data
Aug. 2, 2019 (KR) .................. 10-2019-0094189

(51) Int. Cl.
*G06Q 30/06* (2012.01)
*G06Q 20/12* (2012.01)
(Continued)

(52) U.S. Cl.
CPC ......... *G06Q 30/0635* (2013.01); *G06Q 20/12* (2013.01); *G06Q 30/0613* (2013.01);
(Continued)

(58) Field of Classification Search
CPC .......... G06Q 30/0613; G06Q 30/0635; G06Q 20/12; G06Q 20/40; G06Q 20/381; G06Q 10/0831
(Continued)

(56) References Cited

U.S. PATENT DOCUMENTS 7,966,334 B1 *  6/2011  Bezos ................... G06Q 30/06
                                                    707/748
10,740,826 B2 *  8/2020  Carr ................... G06Q 30/0633
(Continued)

FOREIGN PATENT DOCUMENTS

JP  2002-73967 A   3/2002
JP  4213869 B2 *  1/2009 ......... G06F 16/9535
(Continued)

OTHER PUBLICATIONS

Korean 1st Office Action dated Nov. 22, 2019, in connection with the Korean Patent Application No. 10-2019-0094189 citing the above reference(s).
(Continued)

*Primary Examiner* — Andrew Joseph Rudy
(74) *Attorney, Agent, or Firm* — Bridgeway IP Law Group, PLLC; Sang Ho Lee; Hyun Woo Shin

(57) ABSTRACT

The present invention relates to an e-commerce method capable of integrated ordering and integrated shipment to help a user residing abroad to use a domestic online shopping mall, the e-commerce method including displaying a plurality of online shopping malls on a user terminal, displaying an integrated order product list for a plurality of products selected by a user's input from at least one online shopping mall on the user terminal, receiving a purchase-on-behalf request event for a product of the integrated order product list from the user terminal, receiving first-shipment completion information from an administrator when the first shipment of the product purchased on behalf of the user to
(Continued)

a predetermined shipment destination is completed, and displaying an integrated shipping method list including a plurality of shipping methods corresponding to the product for the second shipment of the product to a user shipment destination on the user terminal.

5 Claims, 17 Drawing Sheets

(51) Int. Cl.
    *G06Q 10/08*     (2012.01)
    *G06Q 20/38*     (2012.01)
    *G06Q 20/40*     (2012.01)

(52) U.S. Cl.
    CPC ..... *G06Q 30/0641* (2013.01); *G06Q 10/0831* (2013.01); *G06Q 20/381* (2013.01); *G06Q 20/40* (2013.01)

(58) Field of Classification Search
    USPC ........................................... 705/26.41
    See application file for complete search history.

(56) References Cited

U.S. PATENT DOCUMENTS

| | | | | |
|---|---|---|---|---|
| 2012/0173385 | A1* | 7/2012 | Fan | G06Q 30/0613 |
| | | | | 705/26.41 |
| 2013/0282533 | A1* | 10/2013 | Foran-Owens | G06Q 30/0641 |
| | | | | 705/27.1 |
| 2015/0134429 | A1* | 5/2015 | Katakwar | G06Q 30/0207 |
| | | | | 705/14.1 |
| 2015/0206128 | A1* | 7/2015 | Torossian | G06Q 20/327 |
| | | | | 705/21 |

FOREIGN PATENT DOCUMENTS

| | | | | | |
|---|---|---|---|---|---|
| KR | 10-2000-0059056 | A | | 10/2000 | |
| KR | 10-2001-0077123 | A | | 8/2001 | |
| KR | 10-2004-0015903 | A | | 2/2004 | |
| KR | 20090120232 | A | * | 11/2009 | ......... G06Q 30/0201 |
| KR | 10-2009-0132260 | A | | 12/2009 | |
| KR | 10-2018-0068140 | A | | 6/2018 | |
| KR | 10-1906087 | B1 | | 10/2018 | |
| KR | 10-1934807 | B1 | | 1/2019 | |

OTHER PUBLICATIONS

Korean Final Office Action dated Jun. 26, 2020, in connection with the Korean Patent Application No. 10-2019-0094189 citing the above reference(s).

Korean Notice of Allowance dated Aug. 21, 2020, in connection with the Korean Patent Application No. 10-2019-0094189 citing the above reference(s).

International Search Report dated Nov. 19, 2020, corresponding to International Application No. PCT/KR2020/010133 citing the above reference(s).

* cited by examiner

ELECTRONIC COMMERCE METHOD CAPABLE OF INTEGRATED ORDERING AND INTEGRATED DELIVERY, AND SERVER THEREFOR

CROSS-REFERENCE TO RELATED APPLICATION

The present application is a national stage filing under 35 U.S.C § 371 of PCT application number PCT/KR2020/010133 filed on Jul. 31, 2020, which is based upon and claims the benefit of priority to Korean Patent Application No. 10-2019-0094189, filed on Aug. 2, 2019, in the Korean Intellectual Property Office, which is incorporated herein in its entirety by reference.

TECHNICAL FIELD

The present invention relates to electronic commerce technology.

BACKGROUND ART

Various online transactions are being made through an Internet-based network in real time. An online marketplace (which is called an open market in Korea) is an online real-time transaction based on the Internet. Unlike individual online shopping malls operated by individual sellers, an online marketplace refers to an open market where anyone can buy goods and anyone can sell goods.

Online marketplace platform service providers attract sellers and buyers as members and provide a virtual space for transactions between them. In Korea, there are various online marketplace platform service providers such as Gmarket, $11^{st}$ Street, and Coupang.

Due to the nature of online marketplaces, overseas buyers as well as domestic residents can access the online marketplaces to purchase products that they want. In this case, overseas buyers have no choice but to pay overseas shipping fees because domestic products must be shipped to foreign countries where the buyers reside. In this case, when purchasing multiple products in one shopping mall or purchasing different products in different shopping malls, it is necessary to pay a shipping fee for each product.

Now, some online shopping malls are making bundled shipment for products they sell, but if providers that sell products are different or when the bundled shipment conditions are not met, each product must be shipped separately, and accordingly, the shipping fee must be paid separately.

Also, integrated ordering may be possible through a single shopping cart in the same online shopping mall, but since integrated ordering cannot be executed between different online shopping malls, a purchaser must visit the shopping malls individually and place orders separately. That is, when using different types of online shopping malls, individual ordering and an individual payment are required for each individual shopping mall, and the complexity of shopping decreases the purchase intention of overseas buyers.

Accordingly, the inventor of the present invention has studied, for a long time, a method for facilitating the use of domestic online shopping malls by overseas buyers and by reducing the burden of shipping fees to promote purchases in the domestic online shopping malls by overseas buyers and, after trial and error, have come to complete the present invention.

DISCLOSURE

Technical Problem

An object of the present invention is to provide an e-commerce method in which products of different types of online shopping malls can be placed in one shopping cart and ordered in an integrated manner.

Also, when each product is individually shipped, particularly, overseas residents may be increasingly burdened with shipping fees. The present invention is directed to providing an e-commerce method capable of saving shipping fees by bundling and shipping multiple products in an integrated manner.

Meanwhile, other objects not specified in the present invention will be additionally considered as long as they can be easily deduced from the following description and effects.

Technical Solution

According to an embodiment of the present invention, there is provided an e-commerce method capable of integrated ordering and integrated shipment to help a user residing abroad to use a domestic online shopping mall, the e-commerce method including displaying a plurality of online shopping malls on a user terminal, displaying an integrated order product list for a plurality of products selected by a user's input from at least one online shopping mall on the user terminal, receiving a purchase-on-behalf request event for a product of the integrated order product list from the user terminal, receiving first-shipment completion information from an administrator when a first shipment of the product purchased on behalf of the user to a predetermined shipment destination is completed, and displaying an integrated shipping method list including a plurality of shipping methods corresponding to the product for a second shipment of the product to a user destination on the user terminal.

According to an embodiment of the present invention, the e-commerce method may further include, after the receiving of the first-shipment completion information, providing the first-shipment completion information to the user terminal after the receiving of the first-shipment completion information.

According to an embodiment of the present invention, the e-commerce method may further include, after the receiving of the purchase-on-behalf request event, sending a product purchase request event for purchasing the product to the online shopping mall server.

According to an embodiment of the present invention, the e-commerce method may further include, before the displaying of the integrated order product list on the user terminal, displaying a pop-up for receiving a request to create the integrated order product list on the user terminal, receiving a creation request event for the integrated order product list from the user, and creating the integrated order product list for the product selected by the user.

According to an embodiment of the present invention, when an event occurs in which the user touches a predetermined region in a display screen of the user terminal, the pop-up may be displayed in the predetermined region for a certain period of time.

According to an embodiment of the present invention, the e-commerce method may further include, before the displaying of the plurality of online shopping malls on the user terminal, displaying a currency selection option to select a currency to pay for the product on the user terminal.

According to the present invention, there is provided an e-commerce server capable of integrated ordering and integrated shipment to help a user residing overseas to use domestic online shopping malls, the e-commerce server including a database unit configured to interoperate with a plurality of online shopping malls to retrieve and store information on the online shopping malls, a product list creation unit configured to create an integrated order product list of a plurality of products selected from at least one online shopping mall, a shipping list creation unit configured to create a plurality of integrated shipping method lists for the products, and a payment processing unit connected to a payment server and configured to process a payment for the products purchased on behalf of the user according to the user's purchase request.

Advantageous Effects

By using the e-commerce method capable of integrated ordering and integrated shipment according to the present invention, it is possible to add products of different online shopping malls to one cart and integratedly order the products.

Also, when each product is individually shipped, overseas residents may be increasingly burdened with shipping fees. According to the present invention, by bundling and shipping multiple products in an integrated manner, it is possible to significantly save shipping fees.

Meanwhile, effects described in the following description and expected by the technical features of the present invention and provisional effects thereof can be treated as described herein even if the effects are not explicitly mentioned herein

Figure 1:
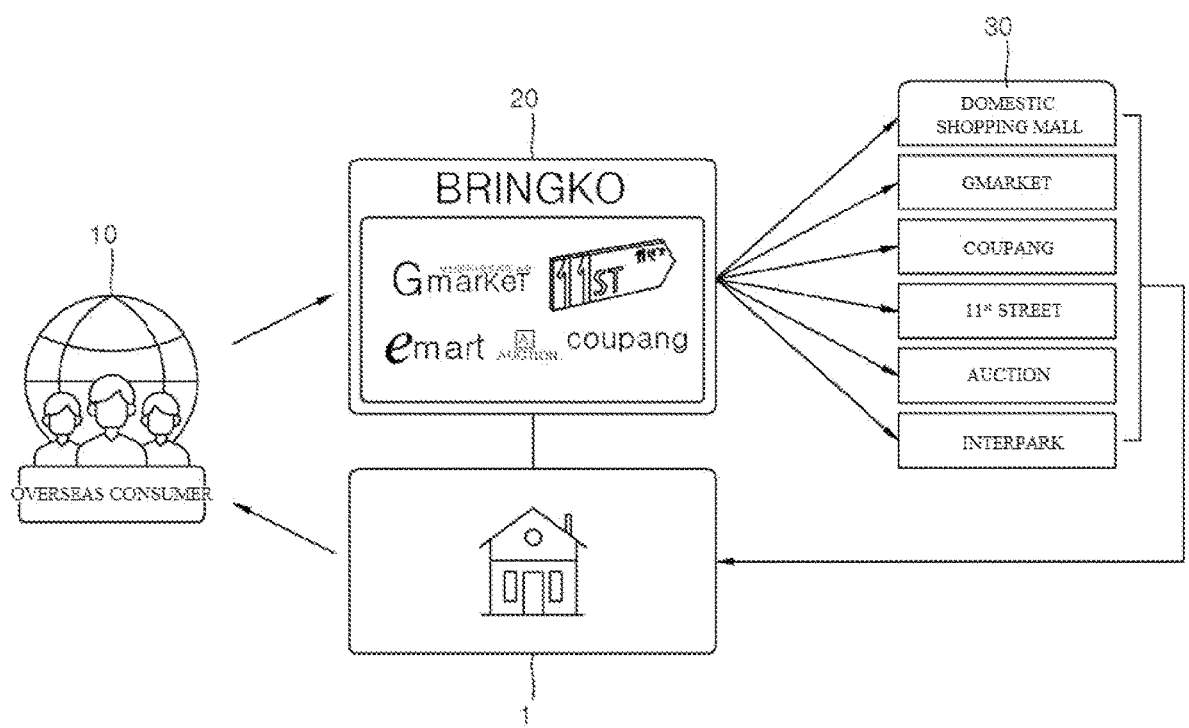
FIG. 1 is a diagram showing a business model according to an embodiment of the present invention.

The accompanying drawings are exemplified by reference for understanding the technical idea of the present invention, and the scope of the present invention is not limited thereby.

MODE FOR CARRYING OUT THE INVENTION

In the following description of the present invention, detailed descriptions of related well-known functions will be omitted when it is determined that the functions are obvious to those skilled in the art and also may unnecessarily obscure the subject matter of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes," and/or "including" when used herein, specify the presence of stated features, integers, steps, operations, elements, components, or combinations thereof but do not preclude the presence or addition of one or more other features, integers, steps, operations, elements, components, and/or combinations thereof.

Hereinafter, embodiments of an e-commerce method capable of integrated ordering and integrated shipment and a server therefor according to the present invention will be described in detail with reference to the accompanying drawings, and the same or corresponding elements will be designated with the same numeral references in the drawings, and redundant descriptions thereof will be omitted.

The e-commerce method capable of integrated ordering and integrated shipment according to an embodiment of the present invention may be implemented with the server for the e-commerce method capable of integrated ordering and integrated shipment according to an embodiment of the present invention. The server for the e-commerce method capable of integrated ordering and integrated shipment according to an embodiment of the present invention is operated by an "integrated shopping mall," and hereinafter is referred herein to as an "integrated shopping mall server" or "integrated service server" herein.

FIG. 1 is a diagram showing a business model according to an embodiment of the present invention.

Referring to FIG. 1, an integrated shopping mall 20 enables a user 10 who resides overseas to efficiently use a domestic online shopping mall 30. The user 10 who resides overseas (an overseas consumer) may experience inconvenience of high shipping fees when using the domestic online shopping mall 30, but the integrated shopping mall 20 can reduce excessive shipping fees for the user 10.

Specifically, the integrated shopping mall 20 may retrieve information on a plurality of domestic online shopping malls 30 and display the online shopping malls to the user 10, and the user 10 may search for and select products in the same environment as those of the domestic online shopping malls 30. The product 10 selected by the user is added not to the shopping cart of the domestic online shopping mall 30 but to the shopping cart of the integrated shopping mall 20, and the user 10 pays for the product on the integrated shopping mall 20 (product payment). According to the payment details of the user, the integrated shopping mall 20 purchases the product from the domestic online shopping mall 30 and pays for the product on behalf of the user (payment on behalf). In this case, the seller of the domestic online shopping mall 30 ships the product to a shipment destination (a first-shipment destination) 1 of the integrated shopping mall 20 (first shipment). That is, the seller of the domestic online shopping mall 30 ships the product to a shipment destination 1 designated by the integrated shopping mall.

The integrated shopping mall 20 ships the product that has been shipped to the shipment destination 1 for the first time to the shipment destination of the user 10 (a second-shipment destination). Here, the user 10 may select a desired shipping method from among shipping methods (shipping means, shipping speed, shipping insurance, etc.) proposed by the integrated shopping mall 20 and make a payment for the second shipment (shipment payment). When the user completes the shipment payment, the integrated shopping mall 20 completes the shipment to the shipment destination of the user 10.

The user pays for a plurality of products to be purchased on the integrated shopping mall 20 through a payment server of the integrated shopping mall 20. Therefore, the user does not need to separately pay on each domestic online shopping mall 30 other than the integrated shopping mall 20.

After the user's payment is completed, the integrated shopping mall 20 purchases (pays for) the plurality of products on the domestic online shopping mall 30. When the products arrive at the shipment destination such as the address of the integrated shopping mall 20 or the address of a warehouse of the integrated shopping mall 20, the integrated shopping mall 20 makes an overseas shipment of the products to the user.

When the user 10 directly conducts Internet shopping at each of the domestic online shopping malls 30 according to the conventional method, a significant shipping fee is charged because shipping fees are applied to all of the purchased products. According to the present invention, however, a user can save a shipping fee because the integrated shopping mall 20 makes an integrated purchase of products that the user wants to buy from domestic online shopping malls 30 in place of (on behalf of) the user and then integratedly ships the products to the user 10.

Figure 2:
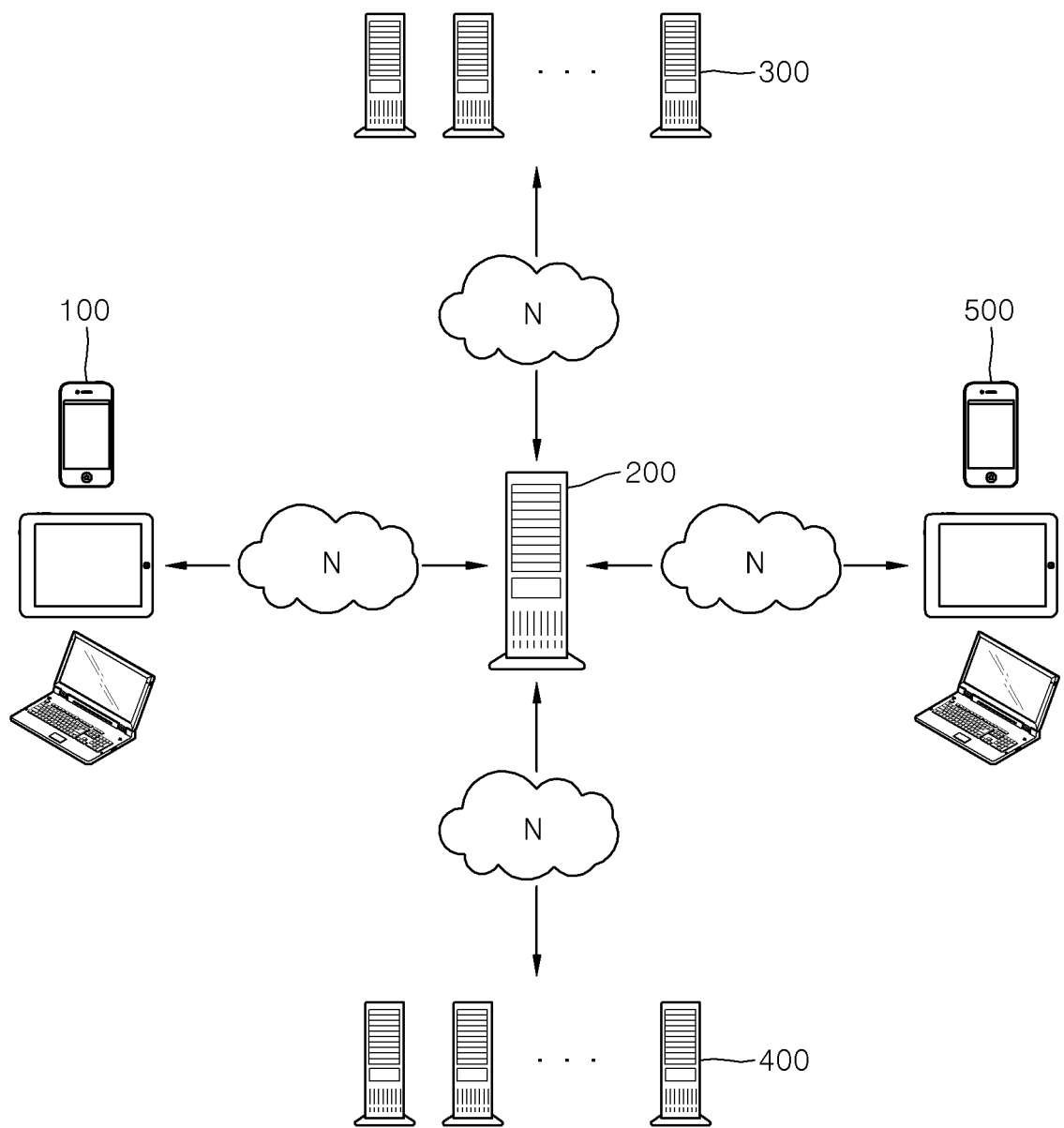
FIG. 2 is a diagram showing an e-commerce system according to an embodiment of the present invention.
Figure 3:
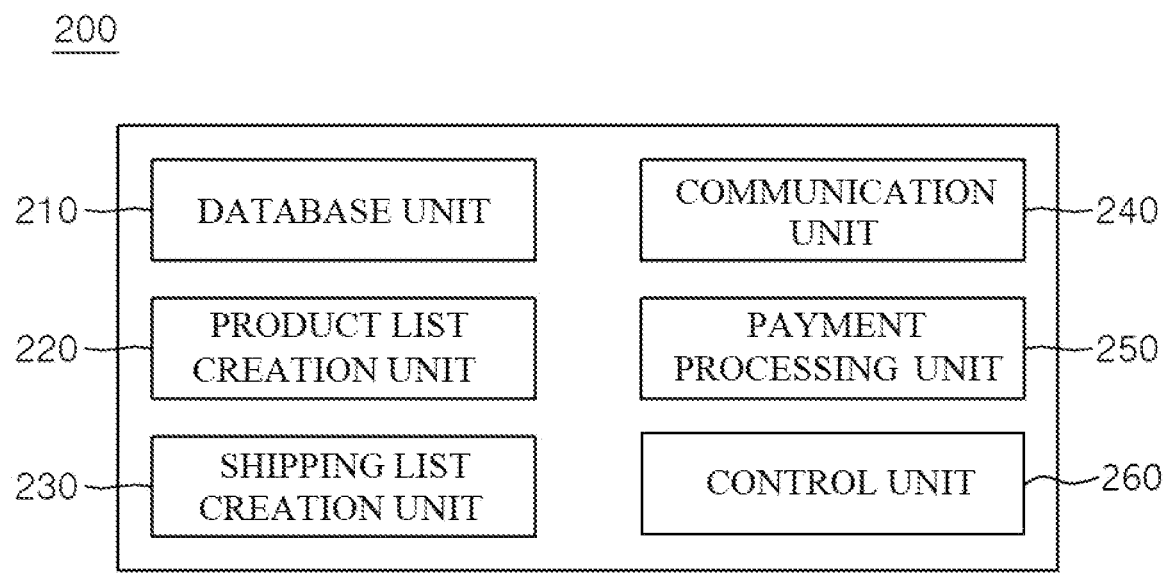
FIG. 3 is a diagram showing an e-commerce server capable of integrated ordering and integrated shipment according to an embodiment of the present invention.

FIG. 2 is a diagram showing an e-commerce system according to an embodiment of the present invention, and FIG. 3 is a diagram showing an e-commerce server capable of integrated ordering and integrated shipment according to an embodiment of the present invention.

Referring to FIG. 2, the e-commerce system capable of integrated ordering and integrated shipment may include a user terminal 100, an integrated shopping mall server 200, an online shopping mall server 300, a payment server 400, and an administrator terminal 500.

The user terminal 100 is a terminal through which users (especially users who reside overseas) can use the integrated shopping mall and may include various devices such as smartphones, mobile phones, tablet PCs, notebooks, desktops, and laptops. However, the present invention is not limited thereto.

The integrated shopping mall server 200, which is a server that is operated by the integrated shopping mall, may communicate with a user over a network N. The network N refers to a connection structure capable of exchange of information between nodes such as terminals and servers, and examples of the network (N) include Internet, Local Area Network (LAN), Wireless LAN, Wide Area Network (WAN), Personal Area Network (PAN), 3G, 4G, 5G, Long-Term Evolution (LTE), Voice over Long-Term Evolution (VoLTE), Wi-Fi, Bluetooth, Near-Field Communication (NFC), Radio-frequency identification (RFID), home networks, and the like. However, the present invention is not limited thereto.

The payment server 400 is a server that receives a payment request from the user terminal 100 or the like to proceeds with payment approval and may include a card company, a bank, a payment agency, and the like.

An administrator may manage the integrated shopping mall as an operator of the integrated shopping mall and may purchase products from domestic online shopping malls on behalf of users. The administrator terminal 500 is a terminal which is used by the administrator and may include various devices such as smartphones, mobile phones, tablet PCs, notebooks, desktops, and laptops. However, the present invention is not limited thereto. Meanwhile, the administrator terminal 500 may communicate with the payment server 400.

Referring to FIG. 3, the integrated shopping mall server 200 of the present invention may include a database unit 210, a product list creation unit 220, a shipping list creation unit 230, a communication unit 240, and a payment processing unit 250. Also, the integrated shopping mall server 200 may further include a control unit 260 including a central processing unit and the like.

It can be understood that the elements of the integrated shopping mall server 200 are not physically but functionally classified. Therefore, it is obvious that the functionally classified elements may also be physically implemented in an integrated manner. Also, the elements of the integrated shopping mall server 200 may be changed as necessary.

The integrated shopping mall server 200 of the present invention is an e-commerce server capable of integrated ordering and integrated shipment to help a user residing overseas to use domestic online shopping malls and may include a database unit 210 interoperating with a plurality of online shopping malls to retrieve and store information on the online shopping malls, a product list creation unit 220 configured to create an integrated ordering product list of a plurality of products selected from at least one online shopping mall, a shipping list creation unit 230 configured to create a plurality of integrated shipping method lists for the products, and a payment processing unit 250 connected to the payment server 400 and configured to pay for the products purchased on behalf of the user according to the user's purchase request.

The database unit 210 may operate with a plurality of online shopping malls and may retrieve and store information on the online shopping malls. Specifically, the database unit 210 may retrieve all product information provided by an online shopping mall, such as products on sale, options, and prices of the online shopping mall. The database unit 210 may share the information with the online shopping mall server 300 and retrieve the information from the online shopping mall server 300 using a technique such as scraping, crawling, etc. The database unit 210 may store the information for each online shopping mall.

The control unit 260 may provide the information stored in the database unit 210 to the user terminal 100. That is, the control unit 260 may provide and display a plurality of online shopping malls on the user terminal 100.

The control unit 260 may provide an online shopping mall website identical or similar to an actual online shopping mall using the information stored in the database unit 210. In this case, the control unit 260 may create and provide a website identical or similar to an actual online shopping mall using the information stored in the database unit 210. For example, when a user wants to shop at an online shopping mall "A," the control unit 260 may display a website identical or similar to the actual appearance of the online shopping mall "A" on the user terminal 100 according to the user's input. Also, when a user wants to shop at an online shopping mall "B," the control unit 260 may display a website identical or similar to the actual appearance of the online shopping mall "B" on the user terminal 100 according to the user's input.

Meanwhile, the control unit 260 may provide an online shopping mall website in a different form from an actual online shopping mall using the information stored in the database unit 210. However, even in this case, since the control unit 260 provides the same environment (prices, options, etc.) as the actual online shopping mall, the user can purchase products under the same conditions as the actual online shopping mall. For example, when a user wants to shop at the online shopping mall "A," the control unit 260 may display a website different from the actual appearance of the online shopping mall "A" on the user terminal 100 according to the user's input, but products on sale, prices, options, and the like may be the same as information on the online shopping mall "A." Also, when a user wants to shop at the online shopping mall "B," the control unit 260 may display a website different from the actual appearance of the online shopping mall "B" on the user terminal 100 according to the user's input, but products on sale, prices, options, and the like may be the same as information on the online shopping mall "B."

That is, even if the control unit 260 provides an online shopping mall in any form, the user can shop based on actual information on the online shopping mall because the database unit 210 retrieves and stores the actual information on the online shopping mall and the control unit 260 provides the actual information.

In this way, the server of the integrated shopping mall may retrieve and provide product information of several domestic online shopping malls. The user may browse and purchase products of the several online shopping malls from the integrated shopping mall.

The product list creation unit 220 may create an integrated order product list for a plurality of products selected from at least one online shopping mall. Here, the integrated order product list may be interpreted as having the same meaning as a list of products added to a shopping cart of the integrated shopping mall. Preferably, the integrated order product list may be interpreted as a list of products which are in the shopping cart of the integrated shopping mall and which are to be finally purchased by the user.

The product list creation unit 220 collectively gathers products selected from different online shopping malls to create the integrated order product list. For example, when a user selects a product "a" from the online shopping mall "A" and a product "b" from the online shopping mall "B," the product list creation unit 220 creates one integrated order product list including the product "a" and the product "b".

That is, the user may add products selected from a plurality of online shopping malls to the shopping cart of the integrated shopping mall. Also, the user may collectively pay for the products added to the shopping cart of the integrated shopping mall (product payment). The user makes a single payment on the integrated shopping mall and does not make a payment on each online shopping mall.

When the user collectively pays for the products, the payment processing unit 250 may be connected to the payment server 400 to request a payment from the payment server 400 and receive payment approval. When the payment approval is made, the payment processing unit 250 sends a payment completion notification to the control unit 260, and the control unit 260 may display the payment completion notification on the user terminal 100 (the payment processing unit 250 may display the payment completion notification on the user terminal 100 but not via the control unit 260).

When the user's product payment is completed, the administrator of the integrated shopping mall may perform a purchase on behalf of the user. The phrase "purchase-on-behalf" refers to a behavior in which the integrated shopping mall pays for a product on an actual online shopping mall in place of a user (payment on behalf).

The purchase-on-behalf may be accomplished by the administrator of the integrated shopping mall accessing the actual online shopping mall through the administrator terminal 500 and making a payment for the purchase.

Alternatively, when the integrated shopping mall server 200 of the present invention further includes a purchase-on-behalf unit, the purchase-on-behalf may be accomplished by the purchase-on-behalf unit accessing the actual online shopping mall and making a payment. In this case, the payment processing unit 250 may make the payment on behalf of the user.

The integrated shopping mall may make a purchase on the actual online shopping mall from which the user selects the corresponding product on the user's behalf. For example, when the user pays for a product "a" of the online shopping mall "A" and a product "b" of the online shopping mall "B" on the integrated shopping mall, the integrated shopping mall may make a purchase of the product "a" on the actual online shopping mall "A" and a purchase of the product "b" on the actual online shopping mall "B."

However, the present invention is not limited thereto, and the purchase-on-behalf may be performed on an online shopping mall different from the actual online shopping mall on which the user selects the corresponding product. That is, the shopping mall on which the purchase is to be made may be flexibly changed depending on the product's option and price. In the above example, the integrated shopping mall may make the purchase of the product "b" as well as the purchase of the product "a" on the actual online shopping mall "A." In particular, when the product "b" of the online shopping mall "A" is cheaper than the product "b" of the online shopping mall "B," it is possible to maximize operating profit by purchasing not only the product "a" but also the product "b" on the online shopping mall "A," unlike the user's choice. When such an algorithm is input to the above purchase-on-behalf unit, the purchase-on-behalf unit may automatically perform a purchase-on-behalf under conditions that maximize the operating profit.

In particular, when the user's payment on the integrated shopping mall is completed, the purchase-on-behalf unit may search a plurality of online shopping malls for the lowest price of the product and performs a purchase-on-behalf on an online shopping mall corresponding to the lowest price.

Meanwhile, the purchase-on-behalf of the integrated shopping mall may be performed for each product payment of a single user. That is, the integrated shopping mall may perform the purchase-on-behalf each time the single user performs a product payment.

Alternatively, the purchase-on-behalf of the integrated shopping mall may be performed for each product payment of a plurality of users. That is, the integrated shopping mall sets a threshold number of people, and when a number of users exceeding the threshold number make a product payment, the integrated shopping mall may start the purchase-on-behalf. For example, the purchase-on-behalf may be performed each time 20 users make a product payment.

Alternatively, the purchase-on-behalf of the integrated shopping mall may be performed based on the number of payments for a specific product. For example, the purchase-on-behalf may be performed each time the number of payments for one product is greater than or equal to a threshold number (e.g., 10). In this case, the purchase-on-behalf may be performed for each product.

For example, when a user "K" pays for a product "a" and a product "b" and a user "P" pays for a product "b" and a product "c," the integrated shopping mall may preferentially proceed with the product "b."

It will be appreciated that, in this case, even for a product for which the number of payments is less than the threshold number (e.g., 10), the purchase-on-behalf may be performed after a certain period of time. That is, in the above case, the integrated shopping mall may perform the purchase-on-behalf of the product "a" or the product "c" after a certain period of time.

Alternatively, the purchase-on-behalf of the integrated shopping mall may be performed based on the total number of orders of a specific product. For example, the purchase-on-behalf may be performed when the total number of orders of one product is greater than or equal to a threshold number (e.g., 10). However, even when the total number of orders is less than the threshold value, the purchase-on-behalf may be performed after a certain period of time.

When the purchase-on-behalf of the integrated shopping mall is completed, the integrated shopping mall may receive the product. Here, the integrated shopping mall sets a shipment destination, and the product may be shipped to the shipment destination. In the following description, the shipment destination is referred to as "first-shipment destination," and the integrated shopping mall receiving the shipment is referred to as "first shipment."

The first-shipment destination may be the address of the integrated shopping mall, a parcel delivery dock, a distribution warehouse, or a nearby place nearby, but the present invention is not limited thereto. When the first shipment of the integrated shopping mall is completed, the administrator of the integrated shopping mall may input first-shipment completion information to the integrated shopping mall server 200. Also, the integrated shopping mall server 200 may store and display the first-shipment completion information on the user terminal 100.

When the first shipment of the product is completed, the shipping list creation unit 230 may create an integrated shipping method list corresponding to the product. The integrated shipping method list may include a plurality of shipping methods corresponding to the product.

The shipping method may include transportation means, shipment speed, and the like. For example, the transportation means may be classified into air shipment, ocean shipment, and the like. The shipment speed may be classified into economy, standard, express, and the like. Furthermore, the shipping method may further include whether a shipment location can be tracked, whether an insurance fee is inclusive, and the like.

When the shipping list creation unit 230 creates a plurality of shipping methods and displays the shipping methods on the user terminal 100 (a notification about the completion of the first shipment can be provided to the user terminal 100 together), the user may select one of the plurality of shipping methods. Also, according to the user's selection of the shipping method, the integrated shopping mall server 200 may receive a request for a shipping fee payment (shipment payment), and the payment processing unit 250 may complete the payment by sending a payment request to the payment server 400 and receiving payment approval. When the payment approval is made, the payment processing unit 250 sends a payment completion notification to the control unit 260, and the control unit 260 may display the payment completion notification on the user terminal 100 (the payment processing unit 250 may display the payment completion notification on the user terminal 100 but not via the control unit 260).

The communication unit 240 is a means for communicating with the user terminal 100, the administrator terminal 500, the payment server 400, etc. The communication unit 240 may be connected to the control unit 260 and controlled by the control unit 260.

As described above, the payment processing unit 250 may process the product payment of the user and the shipment payment of the user. Also, when the integrated shopping mall server 200 is a purchase-on-behalf server, the payment processing unit 250 may process the purchase-on-behalf of the purchase-on-behalf unit.

When the shipment payment of the user is completed, the integrated shopping mall ships the product to a user shipment destination. For convenience of description, the user shipment destination is referred to as a second-shipment destination, and the shipment to the user shipment destination is referred to as second shipment so that the second-shipment destination and the second shipment are distinct from the first-shipment destination and the first shipment, respectively. The integrated shopping mall may perform the second shipment according to a shipping method selected by the user. When the second shipment is completed, the shipment of the product is finally completed.

Since the user can collectively receive multiple products that he or she selects from multiple online shopping malls from the integrated shopping mall, it is possible to maximize the convenience of shopping. Also, it is possible to save shipping fees which are charged when orders are placed on individual online shopping malls.

Figure 4:
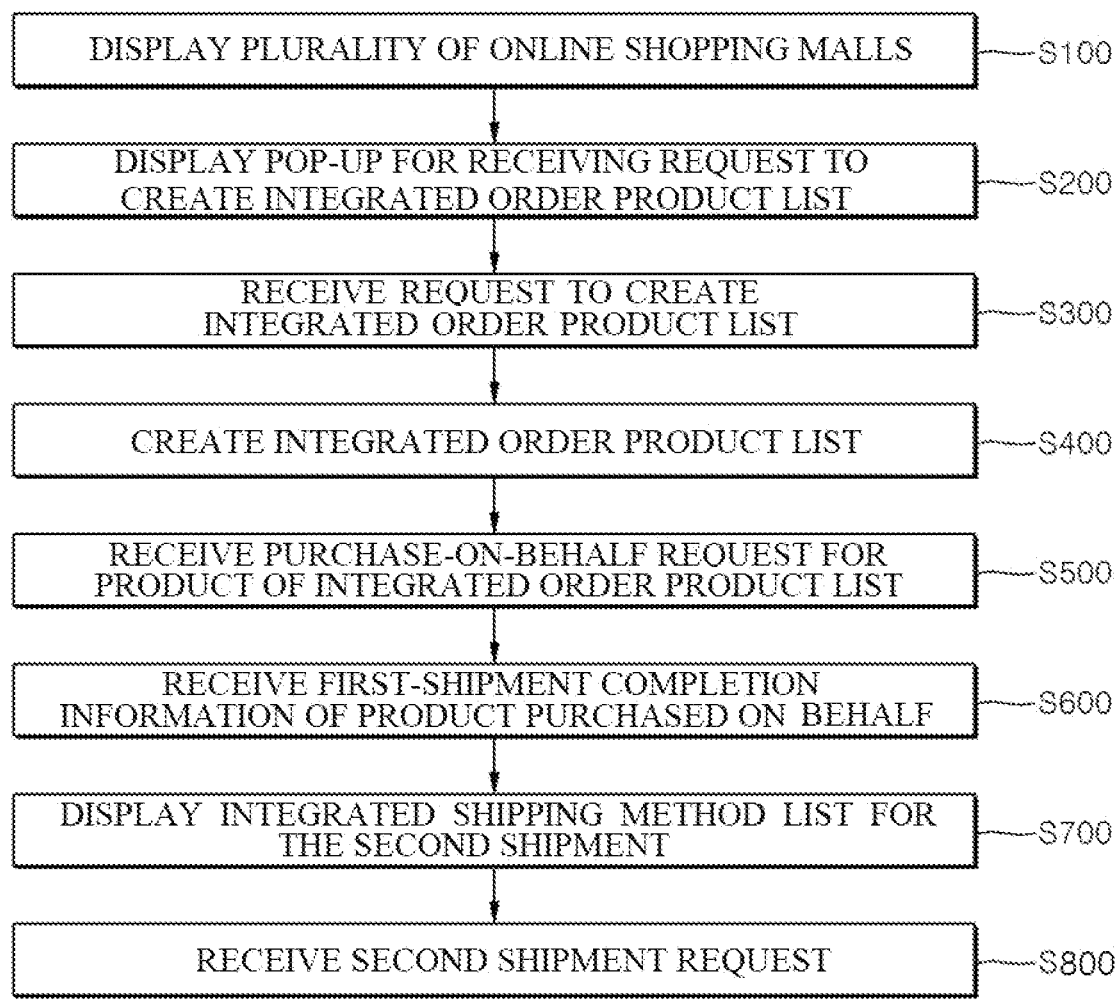
FIG. 4 is a flowchart illustrating an e-commerce method capable of integrated ordering and integrated shipment according to an embodiment of the present invention.

FIG. 4 is a flowchart illustrating an e-commerce method capable of integrated ordering and integrated shipment according to an embodiment of the present invention.

The e-commerce method of the present invention, which is an e-commerce method capable of integrated ordering and integrated shipment to help a user residing abroad to use a domestic online shopping mall, may include displaying a plurality of online shopping malls on a user terminal, displaying an integrated order product list for a plurality of products selected by the user's input from at least one online shopping mall on the user terminal, receiving a purchase-on-behalf request event for a product of the integrated order product list from the user terminal, receiving first-shipment completion information from an administrator when the first shipment of the product purchased on behalf of the user to a predetermined shipment destination is completed, and displaying an integrated shipping method list including a plurality of shipping methods corresponding to the product for the second shipment of the product to a user shipment destination on the user terminal.

Specifically, referring to FIG. 4, the e-commerce method may include displaying a plurality of online shopping malls (S100), displaying a pop-up to receive a request to create an integrated order product list (S200), receiving a request to create an integrated order product list (S300), creating the integrated order product list (S400), receiving a request to perform purchase-on-behalf on a product of the integrated order product list (S500), receiving first-shipment completion information of the product purchased on behalf of a user (S600), displaying an integrated shipping method list for the second shipment (S700), and receiving a second-shipment request (S800).

The operation of displaying a plurality of online shopping malls (S100) is an operation of displaying a plurality of online shopping malls on the user terminal.

First, links to the plurality of online shopping malls (which may be displayed as shopping mall names, logos, and the like) are displayed on the user terminal. When the user selects a link to one online shopping mall, a corresponding online shopping mall website is provided. The online shopping mall website may include information on products of the actual online shopping mall so that the user can shop under the same environment as the actual online shopping mall.

The operation of displaying a plurality of online shopping malls (S100) may be accomplished by the integrated shopping mall server. In particular, the operation of displaying a plurality of online shopping malls (S100) may be accomplished by a database unit of the integrated shopping mall server storing online shopping mall information and a control unit displaying the corresponding information. However, the above operation is not necessarily limited to being performed by a database unit and a control unit and may be changed as necessary. This applies equally to the similar description of the following operations.

The control unit may provide an online shopping mall website identical or similar to the actual online shopping mall using the information stored in the database unit. In this case, the control unit may create and provide a website identical or similar to the actual online shopping mall using the information stored in the database unit.

Meanwhile, the control unit may provide an online shopping mall website different from the actual online shopping mall using the information stored in the database unit. However, even in this case, since the control unit provides the same environment (prices, options, etc.) as the actual online shopping mall, the user can purchase products under the same conditions as the actual online shopping mall.

That is, even when the control unit provides an online shopping mall in any form, the user can shop based on actual information on the online shopping mall because the database unit retrieves and stores the actual information on the online shopping mall and the control unit provides the actual information.

The operation of displaying the integrated order product list on the user terminal is an operation of displaying an integrated order product list for a plurality of products selected by the user's input from at least one online shopping mall on the user terminal.

The operation of displaying the integrated order product list on the user terminal is an operation of creating and then displaying the integrated order product list on the user terminal. The operation of displaying the integrated order product list on the user terminal may be performed by a product list creation unit of the integrated shopping mall server.

The operation of displaying the integrated order product list on the user terminal may be performed after the operation of displaying a pop-up to receive a request to create an integrated order product list (S200), the operation of receiving a request to create an integrated order product list (S300), and the operation of creating the integrated order product list (S400).

The operation of displaying a pop-up to receive a request to create an integrated order product list (S200) is an operation in which the integrated shopping mall server displays a predetermined pop-up on the user terminal wherein the pop-up is for receiving a request to create the integrated order product list from the user. That is, when the user manipulates (touches, clicks, etc.) the pop-up, the request to create the integrated order product list is input. The operation of displaying a pop-up to receive a request to create an integrated order product list (S200) may be performed by the product list creation unit of the integrated shopping mall server.

The pop-up may include a sentence indicating a request to create the integrated order product list. For example, the pop-up may include a sentence such as "check the price on the integrated shopping mall," "add to the shopping mall cart," etc.

The user may view a product on the online shopping mall website provided by the integrated shopping mall server, and when the product is viewed, the pop-up may be displayed. Specifically, when the user opens the "detail view page" of the product, the pop-up may be displayed.

When there is no input from the user terminal for a certain period of time, the pop-up may be displayed. Specifically, when the scroll bar does not move on the user terminal for a certain period of time, the pop-up may be automatically displayed. The pop-up may be displayed in a predetermined region (e.g., a lower portion) of the display screen of the terminal and may disappear after being displayed only for a predetermined period of time.

Also, the pop-up may be displayed when there is a specific input behavior of the user. Specifically, the pop-up may be displayed in a predetermined region for a certain period of time when an event in which the user touches the predetermined region of the display screen of the user terminal occurs.

For example, when the user touches a lower region of the display screen of the user terminal, the pop-up may be displayed in the lower region and, in particular, may disappear after being displayed only for a certain period of time. Furthermore, when the user's touch continues for a predetermined period of time, the pop-up may be displayed. Alternatively, the pop-up may be displayed according to the user's touch pressure, and when the user's touch is strong, the pop-up may be displayed. In addition, there may be various other user input behaviors to create the pop-up.

The operation of receiving a request to create an integrated order product list (S300) is an operation in which the user manipulates (touches, clicks, etc.) the pop-up and the integrated shopping mall server receives an integrated order product list request event. That is, the operation of receiving a request to create an integrated order product list (S300) is an operation in which the integrated shopping mall server receives an input indicating to add the corresponding product to the integrated shopping mall cart. The operation of receiving a request to create an integrated order product list (S300) may be performed by a communication unit of the integrated shopping mall server.

The operation of receiving a request to create an integrated order product list (S300) may be performed by a single-operation input behavior of the user or a multiple-operation input behavior of the user.

First, a case in which the creation of an integrated order product list is requested using a single-operation input behavior of the user will be described.

The user views a product, and the pop-up is displayed on a display screen of the user terminal. When the user manipulates the pop-up by a touch, a click, or the like, the operation becomes a request to create the integrated order product list. For example, when the user touches the pop-up, the touch becomes an input to add the corresponding product to the cart of the integrated shopping mall.

Next, a case in which the creation of an integrated order product list is requested using a multiple-operation input behavior of the user will be described.

For example, the user views a product, and the pop-up is displayed on a display screen of the user terminal. When the user manipulates the pop-up by a touch, a click, etc., a confirmation window including a sentence such as "Do you want to add the product to the cart of the integrated shopping mall?" may be created. Also, when the user manipulates (touches, clicks, etc.) an OK button of the confirmation window, the operation becomes an input to add the corresponding product to the cart of the integrated shopping mall.

As another example, when the user manipulates the pop-up by a touch, a click, etc., an option (color, size, etc.) selection window of the corresponding product may be displayed. The user may select a desired option of the product from the option selection window. A user interface (UI) for adding the corresponding product to the cart of the integrated shopping mall server may be displayed in the option selection window. For example, the product option selection window may have a button including a sentence such as "Add to the cart of the integrated shopping mall." When the user manipulates (touches, clicks, etc.) the UI, the operation becomes an input to add the corresponding product to the cart of the integrated shopping mall.

It will be appreciated that in the second example, as in the first example, a confirmation window including a sentence such as "Do you want to add the product to the cart of the integrated shopping mall?" may be necessary. In this case, when an OK button of the confirmation window is manipulated (touched, clicked, etc.), the operation becomes an input to add the corresponding product to the cart of the integrated shopping mall.

The operation of creating the integrated order product list (S400) is an operation in which the integrated order product list is created using a product selected according to the user's input. That is, the operation of creating the integrated order product list (S400) is an operation in which the user creates a list using products added to the cart of the integrated shopping mall. The operation of creating the integrated order product list (S400) may be performed by the product list creation unit of the integrated shopping mall server.

After the integrated order product list is created, the user may view the integrated order product list when the user manipulates (touches, clicks, etc.) the cart UI. That is, the integrated order product list is displayed on the user terminal.

The operation of receiving a request to perform purchase-on-behalf on a product of the integrated order product list (S500) is an operation in which a purchase-on-behalf request event for a product of the integrated order product list is received from the user terminal. The operation of receiving a request to perform purchase-on-behalf on a product of the integrated order product list (S500) may include an operation of receiving a request to pay for the product of the integrated order product list from the user terminal. The operation of receiving a request to perform purchase-on-behalf on a product of the integrated order product list (S500) may be performed by a payment processing unit and the communication unit of the integrated shopping mall server.

Specifically, when the user views the cart and manipulates an order button, a payment window is created. When a payment is made in the payment window, a payment request may be sent from the user terminal to the integrated shopping mall server. The integrated shopping mall server may communicate with the payment server to receive payment approval. The integrated shopping mall server may receive a purchase-on-behalf request for a product of the integrated order product list by receiving the payment approval from the payment server or by receiving payment confirmation from the user after receiving the payment approval from the payment server.

Meanwhile, the integrated shopping mall server may display a payment completion notification on the user terminal as a result of receiving the payment approval from the payment server or as a result of receiving the payment confirmation from the user after receiving the payment approval from the payment server.

When the user's product payment is completed and the integrated shopping mall server receives a purchase-on-behalf request, the integrated shopping mall server enables the administrator to recognize the purchase-on-behalf request. For example, a notification may be sent to the administrator terminal by a message, an e-mail, a short message service (SMS) text, a push notification, etc. Alternatively, the integrated shopping mall server may create and store a list of events for which the purchase-on-behalf request is received, and the administrator may check the list.

When the administrator recognizes the purchase-on-behalf, the administrator may visit the actual online shopping mall and purchase the product directly. This may be accomplished by the administrator terminal accessing the online shopping mall server.

Meanwhile, after receiving the purchase-on-behalf request event, the integrated shopping mall server may further include sending a product purchase request event for purchasing the product to the online shopping mall server.

That is, the integrated shopping mall server may directly perform the purchase-on-behalf on the online shopping mall in addition to notifying the administrator of the purchase-on-behalf request. Specifically, the integrated shopping mall server may access the online shopping mall server, search for the corresponding product, and complete the payment. In this case, the integrated shopping mall server may automatically perform the purchase-on-behalf even if there is no separate behavior by the administrator. In particular, by inputting a specific algorithm to the integrated shopping mall server, the point of time at which the purchase-on-behalf is carried out may be specified.

The operation of receiving first-shipment completion information of the product purchased on behalf of a user (S600) is an operation of receiving first-shipment completion information from the administrator when the first shipment of the product purchased on behalf of the user to a predetermined shipment destination is completed. The operation of receiving first-shipment completion information of the product purchased on behalf of the user (S600) may be performed by the communication unit of the integrated shopping mall server.

The product purchased on behalf of the user may first be shipped to the predetermined shipment destination. The predetermined shipment destination may be the address of the integrated shopping mall, but the present invention is not limited thereto. When the first shipment is completed, the administrator accesses the integrated shopping mall server and inputs the first-shipment completion information.

When receiving the first-shipment completion information, the integrated shopping mall server may provide the first-shipment completion information to the user terminal. The first-shipment completion information may be provided to the user terminal by a notification such as a message, an e-mail, an SMS text, a push notification, etc. Also, the user may check the first-shipment completion information on a shipment check page.

The operation of displaying an integrated shipping method list for the second shipment (S700) is an operation of displaying an integrated shipping method list for the second shipment of the product to a user shipment destination on the user terminal.

The operation of displaying an integrated shipping method list for the second shipment (S700) may include generating the integrated shipping method list. The integrated shipping method list may include a plurality of shipping methods corresponding to the product.

The shipping method may include transportation means, shipment speed, and the like. For example, the transportation means may be classified into air shipment, ocean shipment, and the like. The shipment speed may be classified into economy, standard, express, and the like. Furthermore, the shipping method may further include whether a shipment location can be tracked, whether an insurance fee is inclusive, and the like.

Also, the shipping method presented to the user terminal may vary depending on the type, weight, and condition of the product. For example, when the weight of the product is too large, air shipment is restricted, and only ocean shipment is allowed and thus may be presented to the user. Also, in the case of foods that are relatively easily perishable, ocean shipment is restricted, and only air shipment is allowed, and further, only express shipment is allowed. Thus, only express air shipment can be presented to the user.

The operation of displaying an integrated shipping method list for the second shipment (S700) and the operation in which the integrated shopping mall server provides the first-shipment completion information to the user terminal may be performed simultaneously or sequentially.

That is, the user may receive the integrated shipping method list while receiving the first-shipment completion information. Alternatively, the user may receive the integrated shipping method list after receiving the first-shipment completion information. Also, in the case of the latter, the user may receive the integrated shipping method list only after confirming the first-shipment completion information.

The operation of receiving a second-shipment request (S800) is an operation of receiving information on a selected shipping method from the user terminal and performing the user's shipment payment after the operation of displaying the integrated shipping method list for the second shipment (S700). The operation of performing the user's shipment payment may include an operation of receiving a shipment payment request from the user terminal and receiving payment approval from the payment server.

The shipping fee may be set differently depending on the shipping method presented by the integrated shopping mall server. When the user reviews the presented shipping method and the shipping fee and selects a shipping method, the shipment payment may be performed according to the user input.

Specifically, when the user views the shipment check page and manipulates a shipment payment button, a payment window is created. When the payment is made through the payment window, the payment request may be sent from the user terminal to the integrated shopping mall server. The integrated shopping mall server may communicate with the payment server to receive payment approval. The integrated shopping mall server may receive the second-shipment request by receiving the payment approval from the payment server or by receiving payment confirmation from the user after receiving the payment approval from the payment server. Meanwhile, the integrated shopping mall server may display a payment completion notification on the user terminal.

When the user's shipment payment is completed and the integrated shopping mall server receives the second-shipment request, the integrated shopping mall server may enable the administrator to recognize the second-shipment request. For example, a notification may be sent to the administrator terminal by a message, an e-mail, an SMS text, a push notification, etc. Alternatively, the integrated shopping mall server may create and store a list of events for which the second-shipment request is received, and the administrator may check the list.

When the administrator recognizes the second-shipment request, the administrator carries out the second shipment. That is, the product is sent to the second-shipment destination using the shipping method selected by the user.

Figure 5:
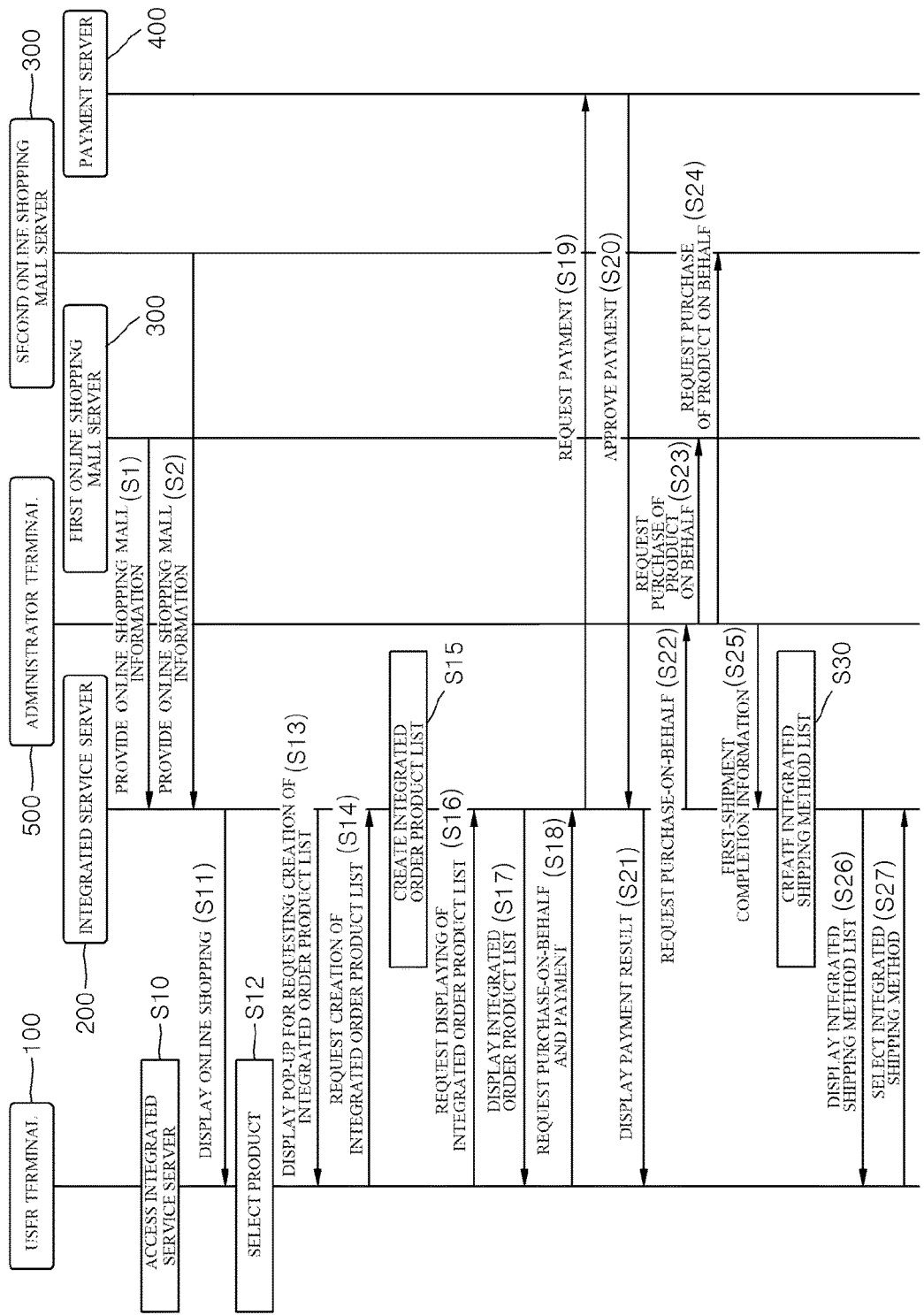
FIG. 5 is a diagram illustrating transmission and reception of data between components to describe the e-commerce method capable of integrated ordering and integrated shipment according to an embodiment of the present invention.

FIG. 5 is a diagram illustrating transmission and reception of data between components for describing the e-commerce method capable of integrated ordering and integrated shipment according to an embodiment of the present invention.

Referring to FIG. 5, the e-commerce method capable of integrated ordering and integrated shipment may be accomplished by a user terminal 100, an integrated shipping mall server (integrated service server) 200, an online shopping mall server 300, a payment server 400, and an administrator terminal 500.

The integrated service server 200 receives online shopping mall information from the online shopping mall server 300. In particular, the integrated service server 200 may receive first online shopping mall information from a first online shopping mall server 300 (S1) and receive second online shopping mall information from a second online shopping mall server 300. The integrated service server 200 may share the information with the online shopping mall server 300 and retrieve the information from the online shopping mall server 300 using a technique such as scraping, crawling, etc.

The user terminal 100 may access the integrated service server 200 (S10). The integrated service server 200 may display an online shopping mall on the user terminal 100 (S11), and the user may shop on the online shopping mall. The user may select a product from the user terminal 100 (S12).

The integrated service server 200 may display an integrated order product list creation request pop-up on the user terminal 100 (S13). The user terminal 100 may request the creation of an integrated order product list (S14). The integrated service server 200 may create the integrated order product list (S15).

When the user terminal 100 requests the displaying of the integrated order product list by inputting a cart view or the like (S16), the integrated service server 200 may display the integrated order product list (S17).

The user terminal 100 may request the purchase-on-behalf from the integrated service server 200 (S18), and the purchase-on-behalf request may include a payment request.

The integrated service server 200 may request payment in communication with the payment server 400 (S19), receive payment approval (S20), and display the payment result on the user terminal 100 (S21).

The integrated service server 200 may request purchase-on-behalf from the administrator terminal 500 (S22). The purchase-on-behalf request (S22) may be accomplished by sending a notification to the administrator terminal 500 or creating a list of events for which the purchase-on-behalf is made.

The administrator terminal 500 may access the first online shopping mall server 300 and/or the second online shopping mall server 300 and may make a purchase on behalf of the user (S23, S24). When the first shipment of the product to the shipment destination is completed, the administrator terminal 500 may input first-shipment completion information to the integrated service server (S25).

When the first-shipment completion information is received, the integrated service server 200 may create an integrated shipping method list (S30). The integrated shipping method list may include shipping methods selectable depending on the product. The integrated service server 200 may display the integrated shipping method list on the user terminal 100 (S26).

The user terminal 100 may select an integrated shipping method and request a shipment payment (S27). The integrated service server 200 may make the shipment payment and receive a second-shipment request when the shipment payment is completed.

When the second-shipment request is received, the administrator sends the product to the user, and the user receives the product. When the second shipment is completed, the purchase of the product is completed.

Figure 6:
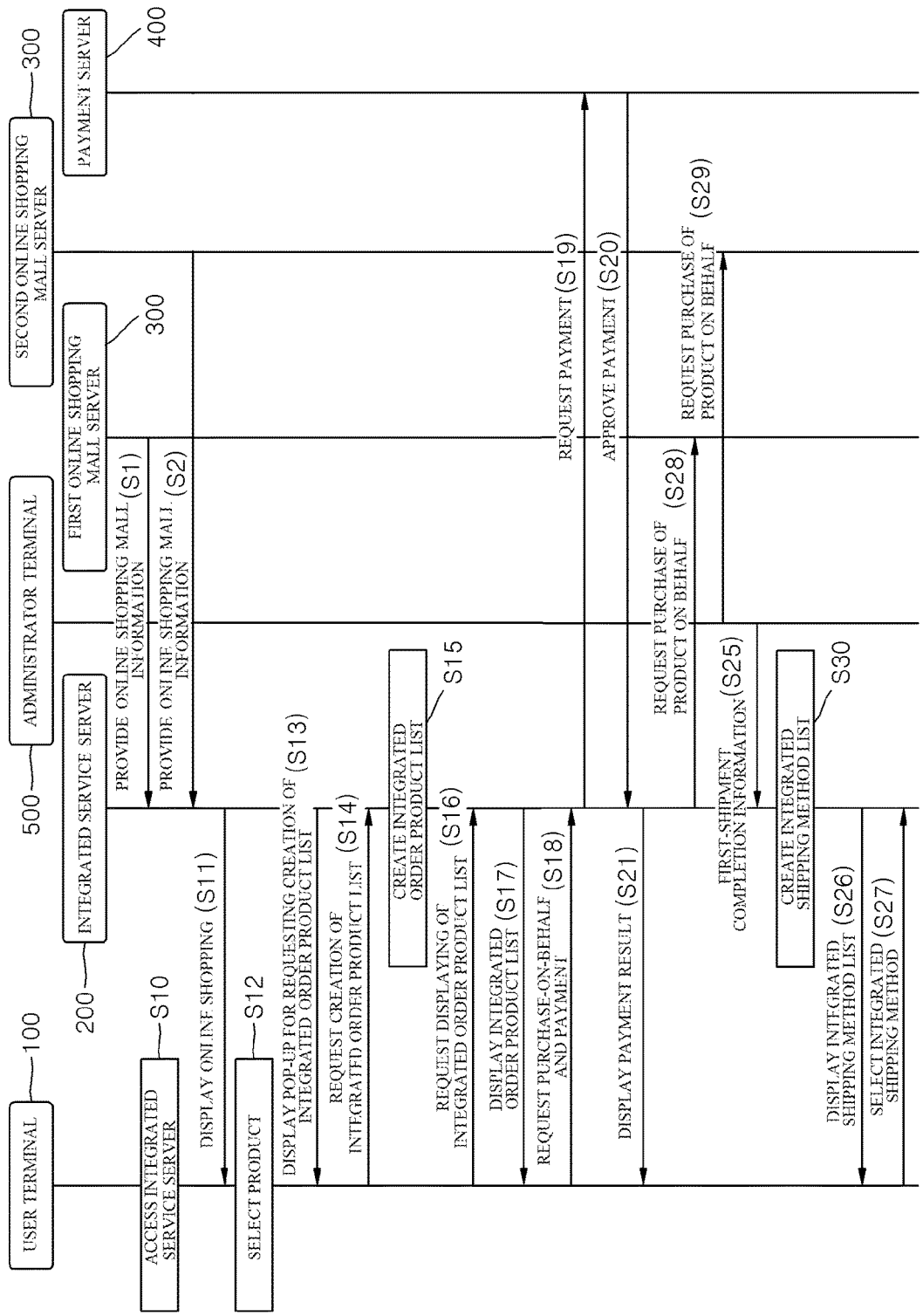
FIG. 6 is a diagram illustrating transmission and reception of data between components to describe the e-commerce method capable of integrated ordering and integrated shipment according to another embodiment of the present invention.

FIG. 6 is a diagram illustrating transmission and reception of data between components to describe the e-commerce method capable of integrated ordering and integrated shipment according to another embodiment of the present invention, which is different from that of FIG. 5.

In FIG. 6, the integrated service server 200 in FIG. 5 may access the online shopping mall server 300 to perform purchase-on-behalf instead of requesting the purchase-on-behalf from the administrator terminal 500 (S22). That is, the integrated service server 200 may request the purchase-on-behalf of the product from the online shopping mall server 300 (S28, S29). In this case, the purchase-on-behalf may be automatically performed even if there is no action by the administrator.

FIGS. 7 to 17 are diagrams illustrating display screens that are displayed on a user terminal by an integrated shopping mall server being driven.

Figure 7:
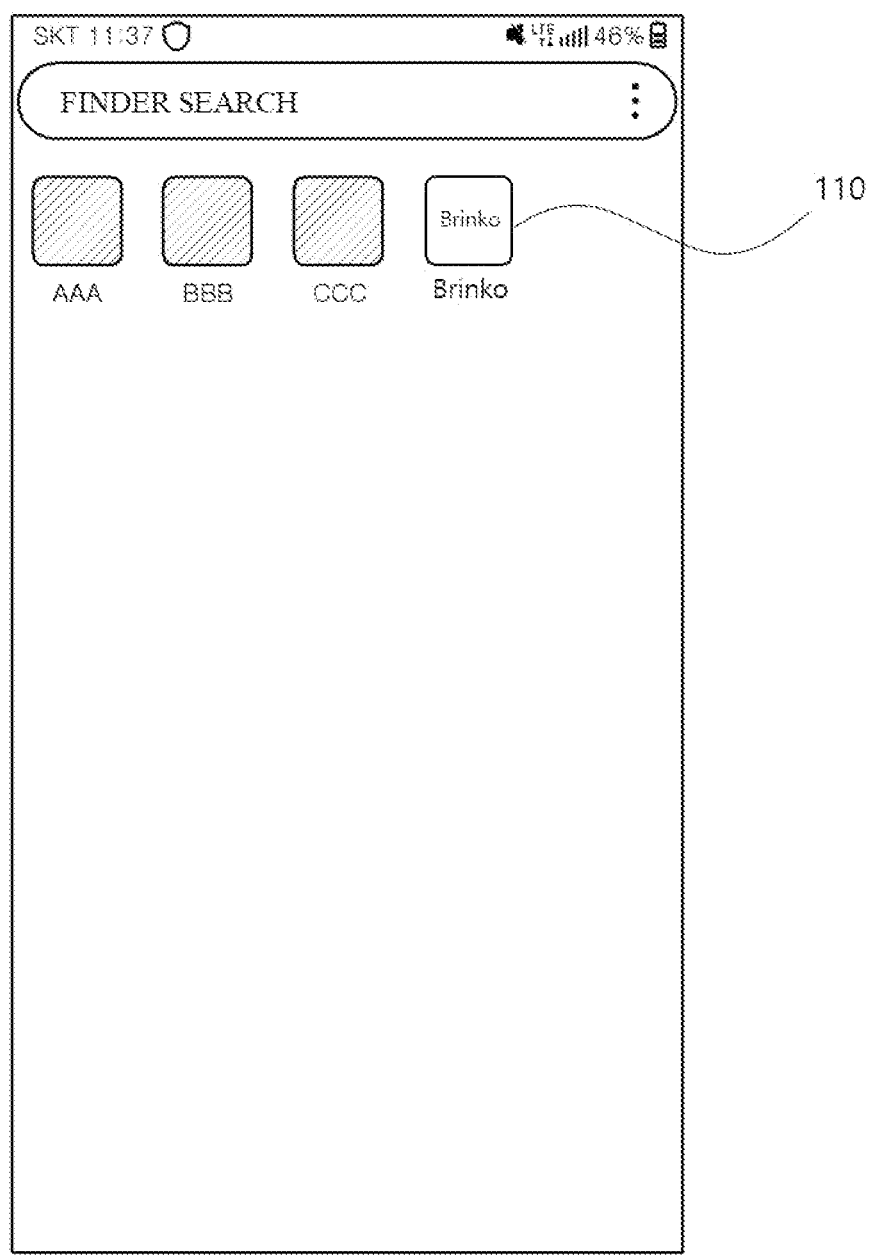
FIGS. 7 to 17 are diagrams illustrating display screens that are displayed on a user terminal when an integrated shopping mall server is driven.

FIG. 7 is a diagram showing that an icon 110 of an application for the integrated shopping mall server is displayed on a display screen of the user terminal. The design of the application may be variously implemented.

Figure 8:
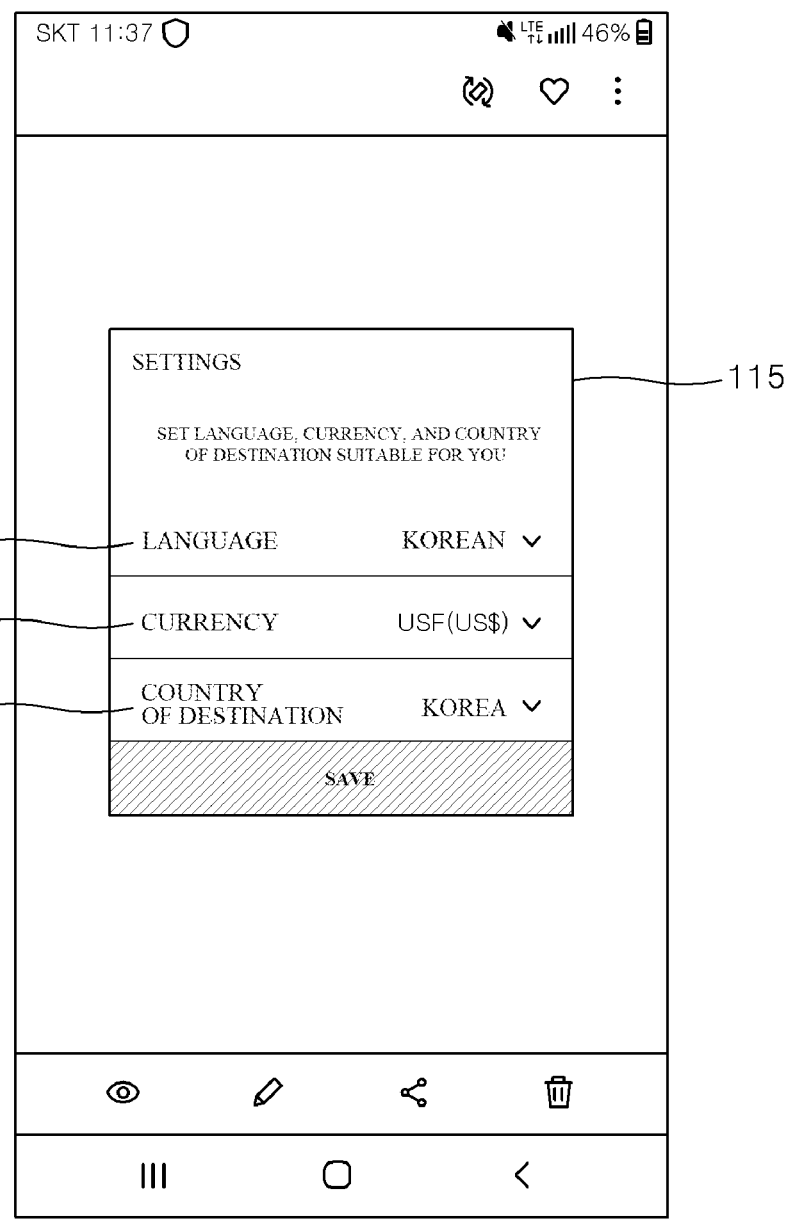

FIG. 8 shows a display screen of the user terminal when the user touches the icon of the application shown in FIG. 7. In particular, the user may automatically or manually receive a setting window 115. In the setting window, a language setting 116, a currency setting 117, and a country setting 118 are presented, and the user may select and set a desired piece from pre-stored information.

Figure 9:
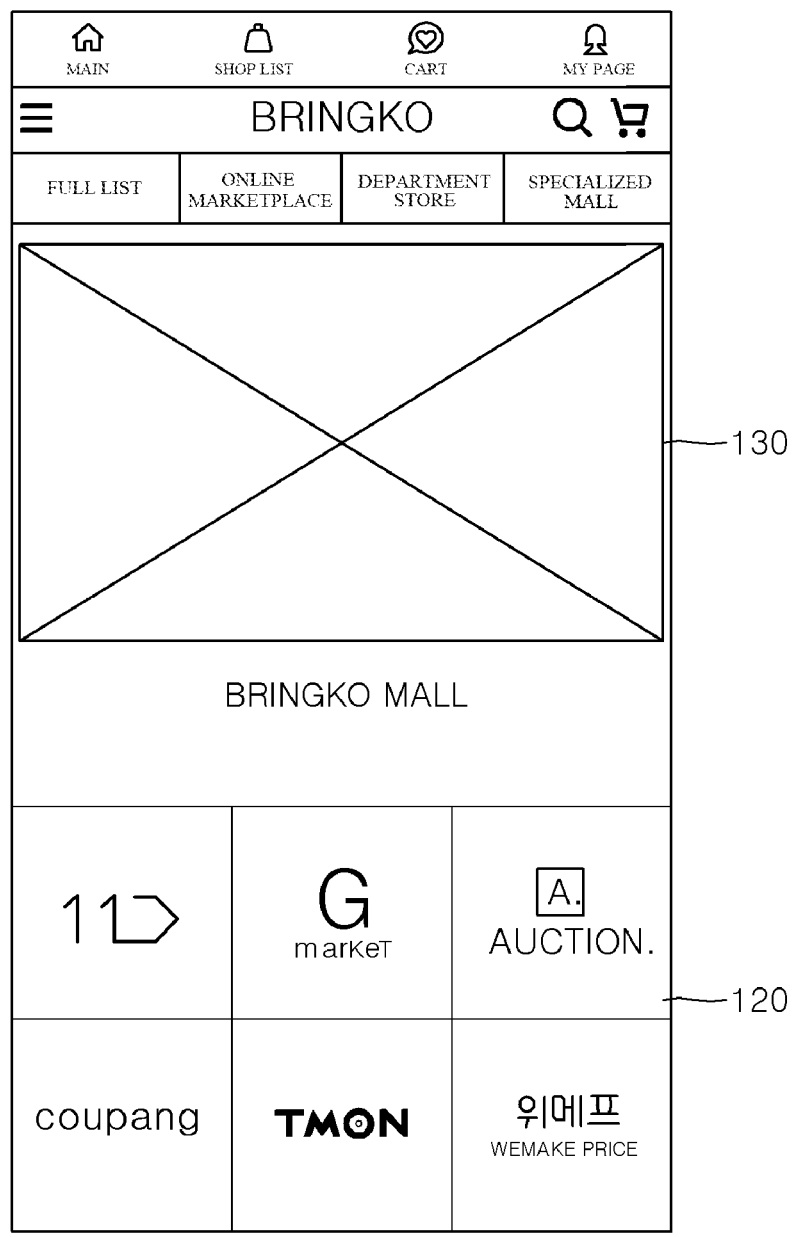

FIG. 9 shows another display screen of the user terminal when the user touches the icon of the application shown in FIG. 7.

As shown in FIG. 9, a link 120 to the online shopping mall provided by the integrated shopping mall server may be displayed on the user terminal in addition to the logo of the online shopping mall. Also, an advertisement 130 may be included in the user terminal.

Figure 10:
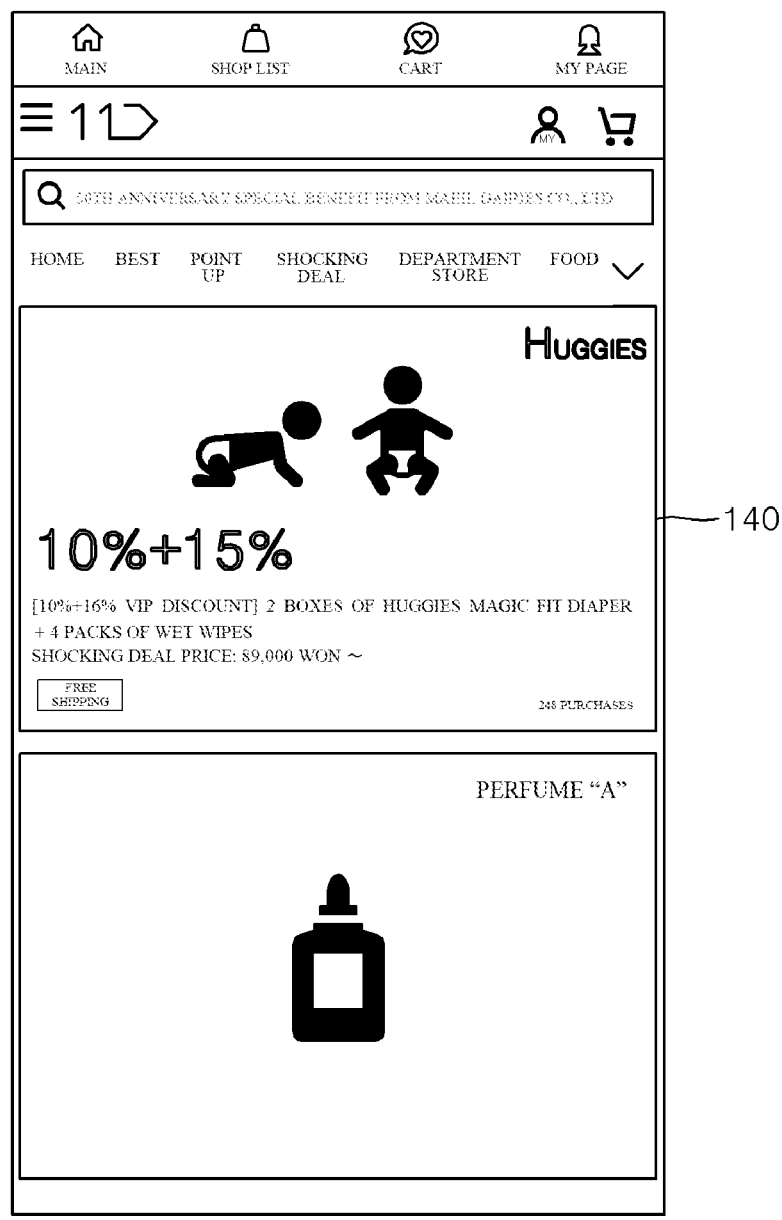

FIG. 10 shows a display screen of the user terminal when the user selects a specific online shopping mall in FIG. 9. In FIG. 10, an online shopping mall "$11^{st}$ Street" is selected, and products being sold in "$11^{st}$ Street" are provided to the user terminal. Also, a webpage identical to the actual screen of "$11^{st}$ Street" may be created. A list 140 of products being sold on "$11^{st}$ Street" may be displayed on the user terminal.

Figure 11:
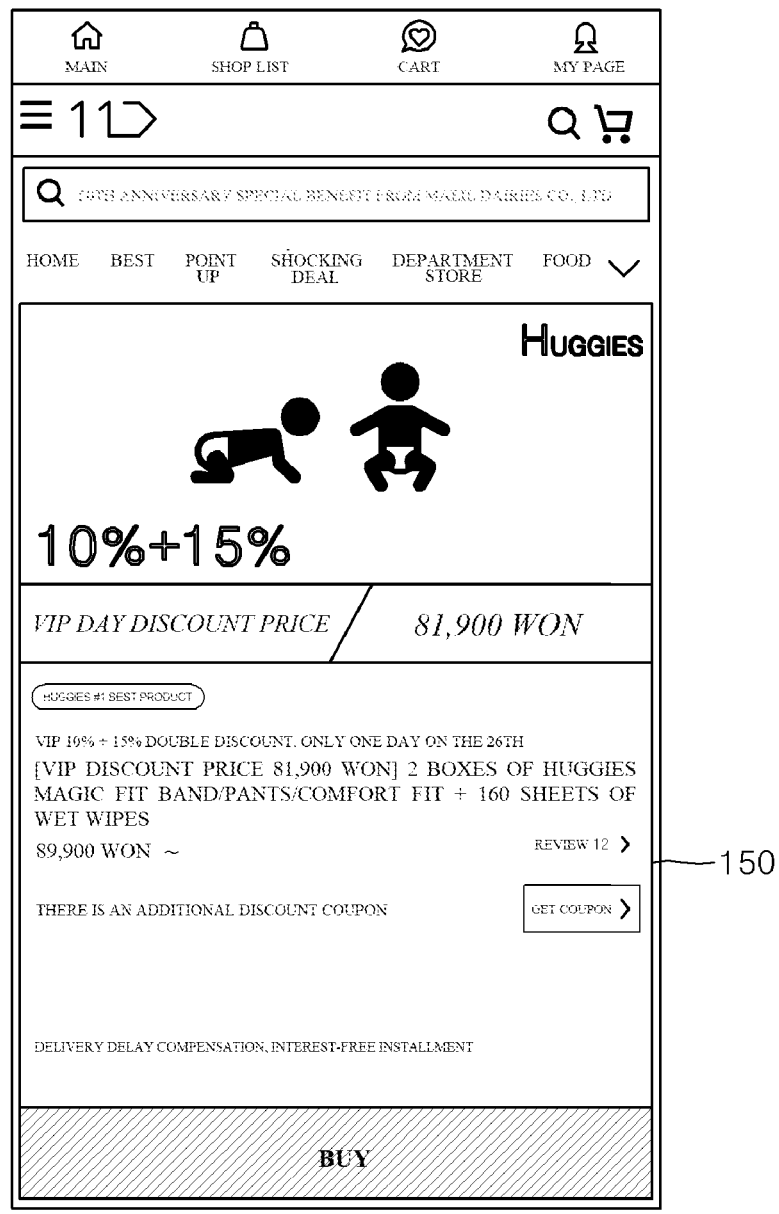

FIG. 11 shows a display screen of the user terminal when the user selects one product in FIG. 10. For example, the user selects "Huggies diapers" and views a detailed view product page 150.

Figure 12:
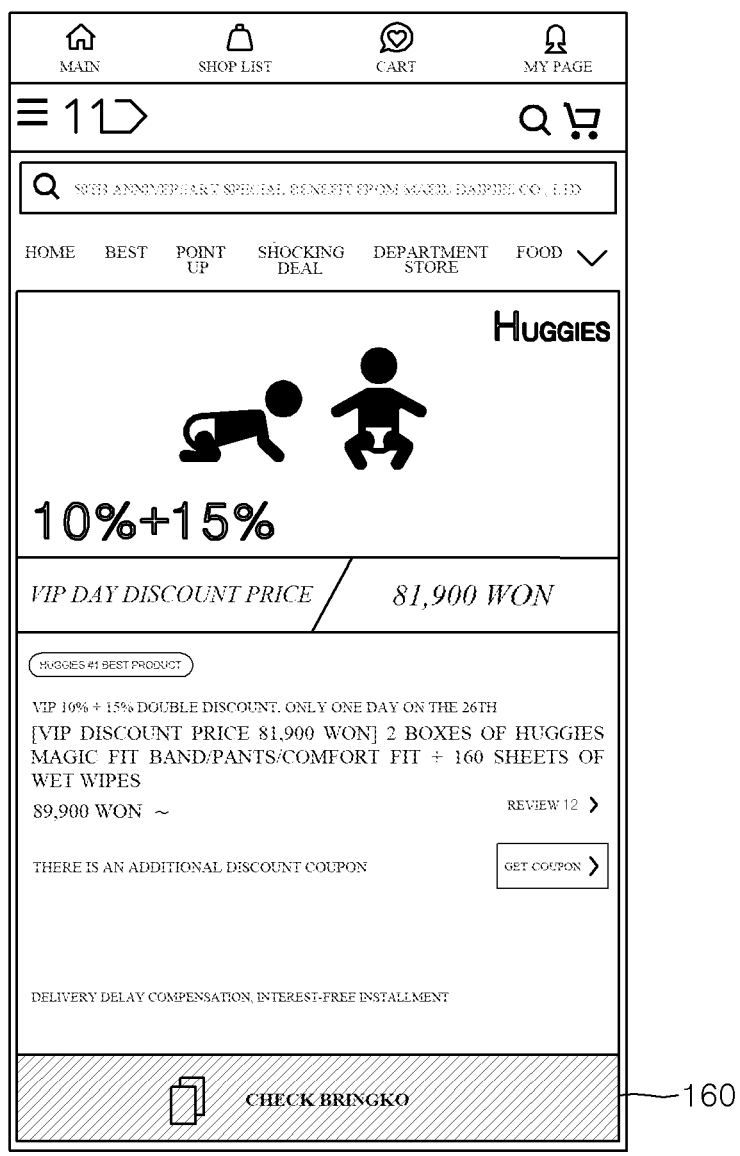

FIG. 12 shows that a pop-up that enables the user to place an integrated order is displayed in FIG. 11. That is, as shown in FIG. 12, a pop-up 160 may be displayed according to a user's input or non-input. The pop-up 160 may include a link that leads to the creation of an integrated order product list.

Figure 13:
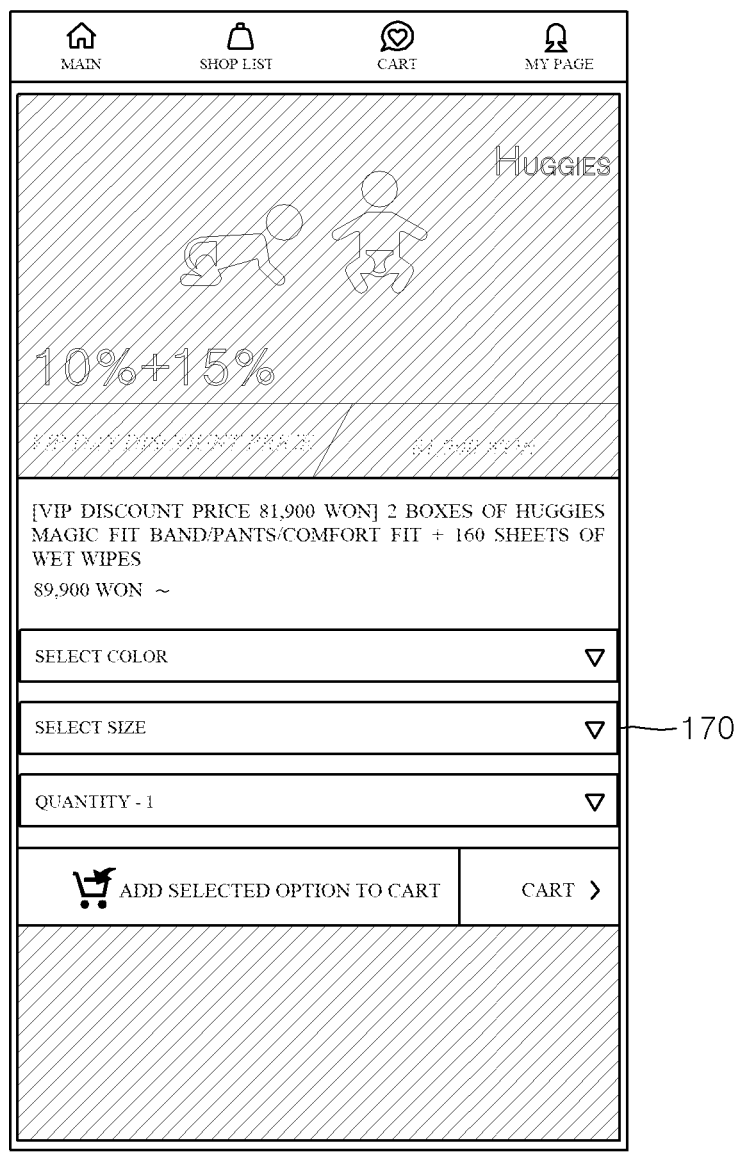

FIG. 13 shows a display screen of the user terminal when the user manipulates the pop-up in FIG. 12. When the user pushes a "Check Prices on Bringko" button in FIG. 12, a product option selection window 170 may be created. The product option selection window 170 is displayed in the same manner as that of the actual online shopping mall. Meanwhile, an "Add Selected Option to Cart" button may be displayed in a lower portion of the option selection window 170.

Figure 14:
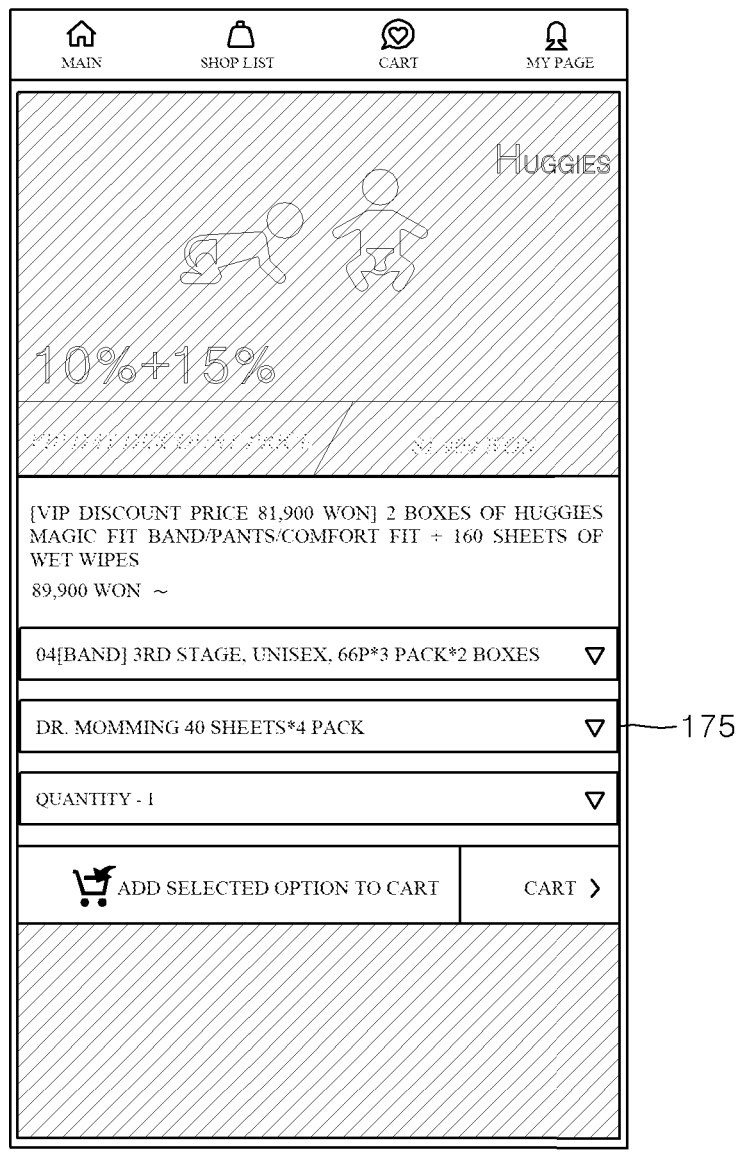

FIG. 14 shows a display screen of the user terminal when the user selects an option in FIG. 13. The user may select desired information 175 from prestored information.

Figure 15:
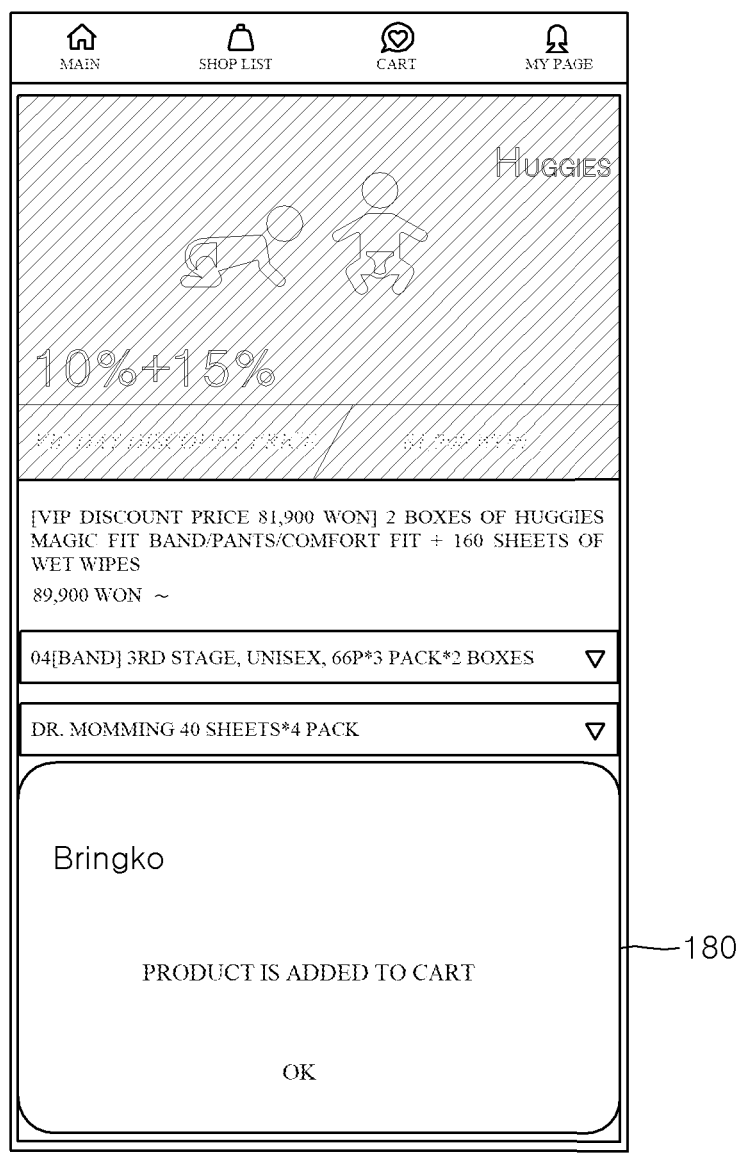

FIG. 15 shows a display screen of the user terminal when the user adds a corresponding product to the cart of the integrated shopping mall in FIG. 14. That is, when the user selects an option in FIG. 14 and manipulates the "Add Selected Option to Cart" button, a product corresponding to the option may be stored in the cart of the integrated shopping mall. The integrated shopping mall server may display a result window 180 on the user terminal. Also, the integrated shopping mall server may create an integrated order product list.

Figure 16:
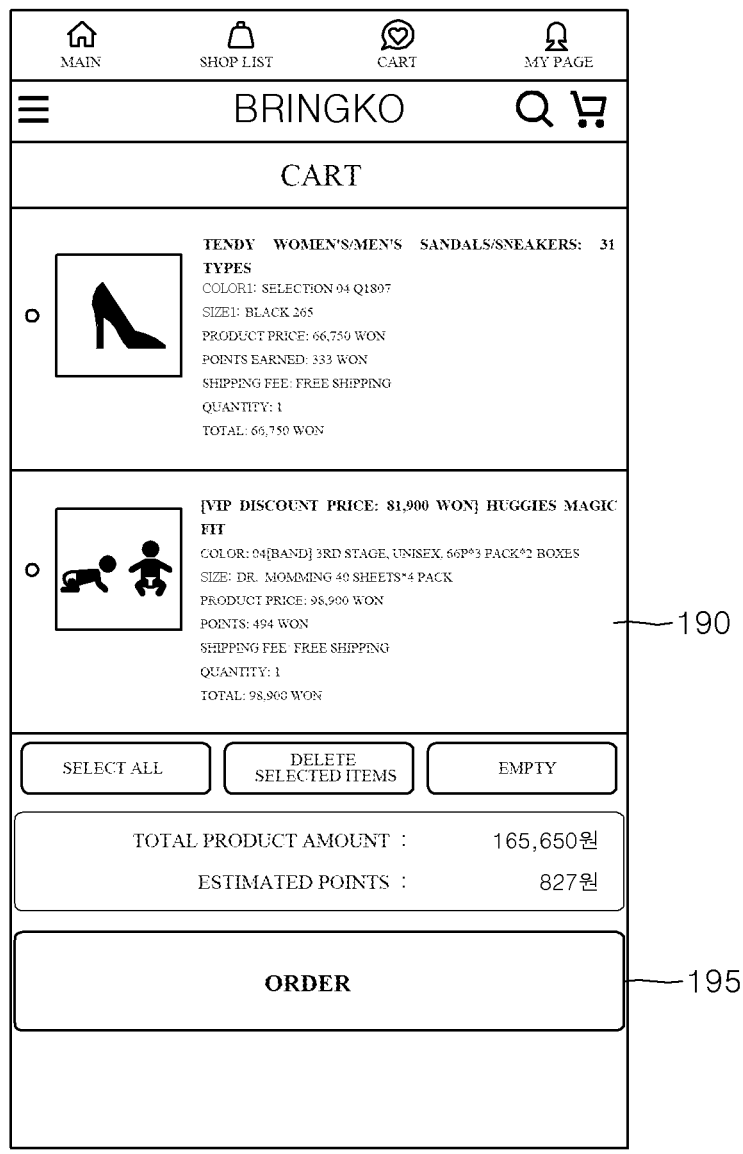

FIG. 16 shows an integrated order product list provided to the user. When the user inputs a request to display the integrated order product list, for example, by clicking a "View Cart" button, the integrated shopping mall server may display an integrated order product list 190 on the user terminal.

Meanwhile, a purchase-on-behalf request UI 195 such as an order button may be displayed in a lower portion of the integrated order product list 190. When the purchase-on-behalf request UI 195 is manipulated, payment for the corresponding product is performed. When the payment is completed, the integrated shopping mall server may receive a purchase-on-behalf request.

Figure 17:

FIG. 17 shows an integrated shipping method list provided after the first shipment is completed.

As for the integrated shipping method, as shown in FIG. 17, possible shipping methods may be clearly displayed. An integrated shipping method list 196 may include a shipping method 197 such as shipment transportation means or shipment speed, a shipping fee 198, shipment-related explanation, etc. Also, the integrated shipping method list 196 includes a user selection UI 199, and the user selection UI 199 may be activated to select only one of a plurality of shipping methods 197.

The scope of the present invention is not limited to the description and expression of the embodiments explicitly described above. In addition, the scope of the present invention may not be limited due to obvious changes or substitutions in the technical field to which the present invention pertains.

DESCRIPTION OF THE SYMBOLS

10: User
20: Integrated Shopping Mall

30: Online Shopping Mall
100: User Terminal
200: Integrated Shopping Mall Server, Integrated Service Server
300: Online Shopping Mall Server
500: Administrator Terminal

The invention claimed is:

1. An e-commerce method configured to provide integrated ordering and integrated shipment for an integrated shopping mall server to facilitate a user residing abroad to online shop at a plurality of domestic online shopping malls, the e-commerce method comprising:

an operation of displaying the plurality of online shopping malls on a user terminal;

an operation of displaying an integrated order product list for a plurality of products selected by a user's input from one or more domestic online shopping malls of the plurality of domestic online shopping malls on the user terminal;

an operation of receiving a purchase-on-behalf request event for each product in the plurality of products of the integrated order product list from the user terminal, wherein the receiving comprises receiving a payment request for the each product in the plurality of products of the integrated order product list from the user terminal;

an operation in which a purchase-on-behalf and payment request for the each product in the plurality of products of the integrated order product list is received from the user terminal, a payment processing unit of the integrated shopping mall server is connected to a payment server to request a payment, and payment approval is received to accomplish the payment between the user and the integrated shopping mall server;

an operation in which a purchase-on-behalf unit of the integrated shopping mall server performs a purchase for the each product in the plurality of products of the integrated order product list on behalf of the user, wherein the purchase-on-behalf unit searches, for the each product in the plurality of products of the integrated order product list, a lower price among the plurality of domestic online shopping malls, and when the lower price is found purchases the product at the lower price from the online shopping mall in which the lower price for the product is found, or otherwise purchases the product at the price associated with the domestic online shopping mall of the one or more domestic online shopping malls from which the product is selected by the user;

an operation of receiving first-shipment completion information from an administrator when a first shipment of the each product in the plurality of products of the integrated order product list purchased on behalf of the user to a predetermined shipment destination is completed, wherein the first shipment destination is a domestic location predetermined to receive shipments from the plurality of domestic online shopping malls;

an operation of providing the first-shipment completion information to the user terminal to notify the user;

an operation of displaying an integrated shipping method list for a second shipment of the plurality of products of the integrated order product list to a user shipment destination on the user terminal, wherein the integrated shipping method list comprises a plurality of shipping methods corresponding to the plurality of products of the integrated order product list, and wherein the user shipment destination is an abroad shipping address predetermined by and associated with the user;

an operation of receiving a shipment payment request and second-shipment request information from the user terminal; and an operation of providing the second-shipment request information to the user terminal to notify the user.

2. The e-commerce method of claim 1, further comprising displaying a currency selection option to select a currency to pay for the product on the user terminal before the displaying of the plurality of online shopping malls on the user terminal.

3. The e-commerce method of claim 1, further comprising sending a product purchase request event for purchasing the product to an online shopping mall server after the receiving of the purchase-on-behalf request event.

4. The e-commerce method of claim 1, further comprising, before the displaying of the integrated order product list on the user terminal:

displaying a pop-up for receiving a request to create the integrated order product list on the user terminal;

receiving a creation request event for the integrated order product list from the user; and creating the integrated order product list for the product selected by the user.

5. The e-commerce method of claim 4, wherein when an event occurs in which the user touches a predetermined region in a display screen of the user terminal, the pop-up is displayed in the predetermined region for a certain period of time.

* * * * *